(12) United States Patent
Baitz et al.

(10) Patent No.: US 8,342,291 B2
(45) Date of Patent: Jan. 1, 2013

(54) CHECKOUT SYSTEM

(75) Inventors: Guenter Baitz, Berlin (DE); Uwe Kirschke, Berlin (DE)

(73) Assignee: Wincor Nixdorf International GmbH (DE)

( * ) Notice: Subject to any disclaimer, the term of this patent is extended or adjusted under 35 U.S.C. 154(b) by 116 days.

(21) Appl. No.: 12/742,780

(22) PCT Filed: Nov. 12, 2008

(86) PCT No.: PCT/EP2008/009525
§ 371 (c)(1),
(2), (4) Date: May 13, 2010

(87) PCT Pub. No.: WO2009/077041
PCT Pub. Date: Jun. 25, 2009

(65) Prior Publication Data
US 2010/0258381 A1 Oct. 14, 2010

(30) Foreign Application Priority Data

Dec. 15, 2007 (DE) ............... 20 2007 017 525 U

(51) Int. Cl.
*A47F 9/04* (2006.01)
*H02B 1/00* (2006.01)
(52) U.S. Cl. ..................... 186/59; 361/600
(58) Field of Classification Search .......... 186/52, 186/59, 61; 194/350; 312/198, 199, 249.1; 235/1 D; 902/22, 24, 30; 109/45, 49, 50; 70/432, 441; 340/815.78; 439/248, 525, 439/526, 529, 530, 577, 926, 928, 928.1; 361/600, 679.01, 679.02, 679.58, 730, 731, 361/732, 735, 742
See application file for complete search history.

(56) References Cited

U.S. PATENT DOCUMENTS

| | | | |
|---|---|---|---|
| 4,208,081 A | 6/1980 | Kekas et al. | |
| 4,501,460 A | 2/1985 | Sisler | |
| 4,527,285 A | 7/1985 | Kekas et al. | |
| 4,784,416 A * | 11/1988 | Crown et al. | 292/341.15 |

(Continued)

FOREIGN PATENT DOCUMENTS

DE 100 58 601 A1 5/2002

(Continued)

*Primary Examiner* — Mark Beauchaine
(74) *Attorney, Agent, or Firm* — Harness, Dickey & Pierce, P.L.C.

(57) ABSTRACT

A checkout system for handling sales or payment transactions with a computer module for electronically processing payment-related data, with at least one peripheral module which is connected electrically and mechanically to the computer module, wherein a housing wall of at least one peripheral device adjoins a housing wall of the computer module such that the mutually facing housing walls of said computer module and said peripheral module are arranged parallel, characterized in that the peripheral module (3) is in electrical contact with the computer module (2) and/or with a further peripheral module (4) by means of an electrical plug device (23, 28), wherein the electrical plug device (23, 28) has at least corresponding plug/connection elements (24, 29) which are respectively arranged on the mutually facing housing walls (14, 15) of the adjacent modules (2, 3, 4), and wherein the peripheral module (3) can be mechanically locked to the computer module (2) and/or to at least the further peripheral module (4) by means of a latching device (18, 25).

12 Claims, 2 Drawing Sheets

U.S. PATENT DOCUMENTS

Figure 1:
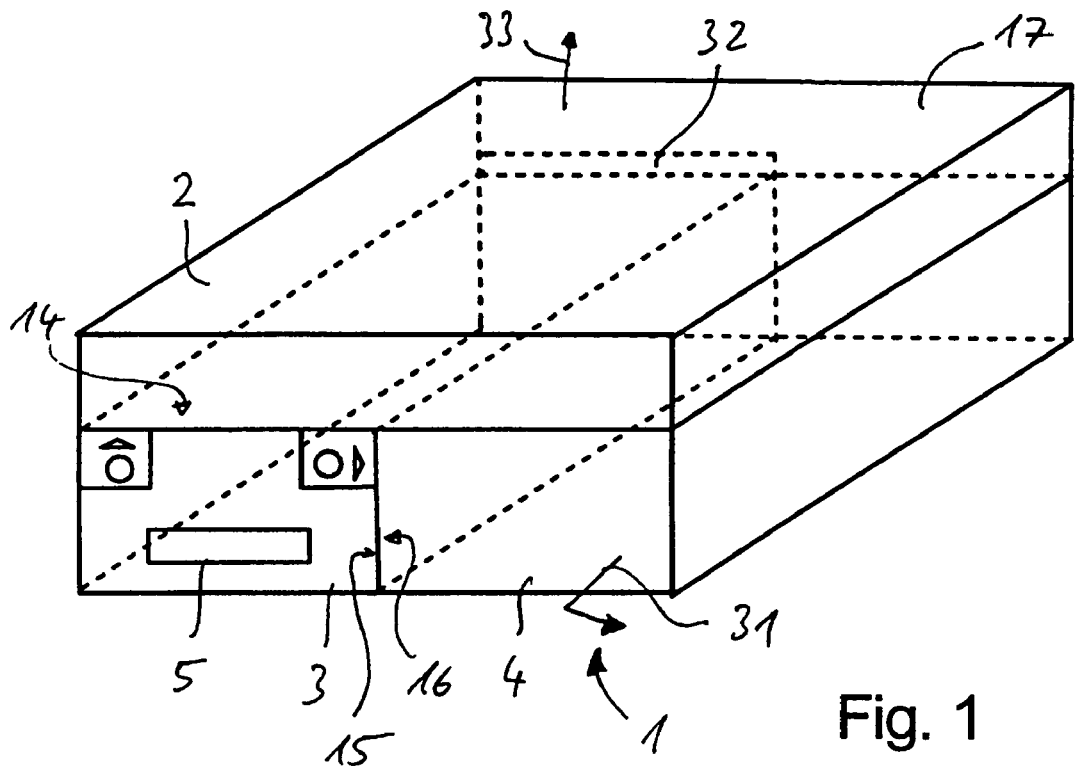

| | | |
|---|---|---|
| 4,841,412 A | 6/1989 | Heys, Jr. et al. |
| 5,311,397 A * | 5/1994 | Harshberger et al. ..... 361/679.58 |
| 5,927,878 A | 7/1999 | Kasai et al. |
| 6,335,861 B1 | 1/2002 | Ramsey, III et al. |
| 6,435,329 B1 * | 8/2002 | Amari et al. .................. 194/206 |
| 6,490,156 B2 * | 12/2002 | Chen ......................... 361/679.4 |
| 7,239,509 B1 | 7/2007 | Roeske |
| 7,656,671 B2 * | 2/2010 | Liu et al. ....................... 361/735 |
| 7,740,120 B2 * | 6/2010 | Shimizu et al. .............. 194/302 |
| 2007/0240966 A1 * | 10/2007 | Tabachnik .................... 194/206 |

FOREIGN PATENT DOCUMENTS

| | | |
|---|---|---|
| DE | 10 2004 040856 A1 | 3/2006 |
| DE | 202007017525 U1 | 4/2008 |
| JP | 05 047444 A | 2/1993 |
| JP | 09006719 A | 1/1997 |
| WO | 2005-116943 | 12/2005 |

* cited by examiner

CHECKOUT SYSTEM

CROSS-REFERENCE TO RELATED APPLICATIONS

This application is a 371 National Stage of International Application No. PCT/EP2008/009525, filed Nov. 12, 2008. This application claims the benefit and priority of German Patent Application No. 20 2007 017525.6 filed Dec. 15, 2007. The entire disclosures of each of the above applications are incorporated herein by reference.

FIELD

The invention relates to a checkout system for handling sales or payment transactions with a computer module for electronically processing payment-related data, with at least one peripheral module which is electronically and mechanically connected to the computer module, wherein a housing wall of at least one peripheral module adjoins a housing wall of the computer module such that the mutually facing walls of said computer and said peripheral module are arranged parallel.

BACKGROUND

The statements in this section merely provide background information related to the present invention and may not necessarily constitute prior art.

A checkout system is known from DE 10 2004 040 856 A1 for handling sales or payment transactions which includes a housing as the central structural unit in which are located a computer module for the electronic processing of payment-related data and a hard disk as the peripheral module which can be detachably connected to the computer module. The computer module is configured as a motherboard on which the central unit is located. The hard disk is located displaceably in a compartment in the housing of the computer module so that it is possible to replace the hard disk relatively easily for service purposes. However, the hard disk is mounted in a frame which is attachable to the computer module by means of threaded fasteners. The disadvantage thereof is that replacement of the peripheral module is possible only with the aid of a tool for threaded fasteners.

A computer system is known from U.S. Pat. No. 4,501,460 in which a computer module can be latched or unlatched without the aid of a tool, using a peripheral module configured as a storage medium. However, the latching mechanism provided for this purpose includes a lever mechanism and a latch bar extending along one housing wall of the computer module which can be moved reciprocally lengthwise by means of the lever mechanism between a locking (capturing) position and an unlocking (accommodating) position. In the latched position, hooking members on the peripheral module are engaged in corresponding recesses in the housing wall of the computer module. In the latched position, the peripheral module makes electrical contact with the computer module by way of an electrical plug device. In the unlatched position, the hooking members of the computer module are brought to a disengaged position relative to the recesses on the computer module so that the peripheral module is separated from the computer module, from a contacting position in which mutually facing housing walls of the computer module and the peripheral module immediately adjoin each other. The disadvantage of the known computer system is that the latching mechanism has a relatively complex configuration. The space it requires in particular is relatively large.

SUMMARY

This section provides a general summary of the disclosure, and is not a comprehensive disclosure of its full scope or all of its features.

The object of the present invention is to further develop a checkout system for handling sales and payment transactions in such a manner that installation or removal of a computer module and at least one peripheral module is ensured in an easy-to-manage manner without the aid of tools.

To achieve this object, the invention in conjunction with the preamble of claim 1 is characterized in that the peripheral module makes electrical contact with the computer module by way of an electrical plug device and/or a further peripheral module, wherein the electrical plug device has at least corresponding plug/connection elements that are disposed respectively on the mutually facing housing walls of the adjacent modules, and in that the peripheral module can be mechanically locked to the computer module and/or to at least the further peripheral module by means of a latching device.

The particular advantage of the invention is that secure and reliable locking and unlocking between a computer module and at least one peripheral module is rendered practicable at a relatively low cost.

The basic concept of the invention is firstly to use an electrical plug device and secondly to use a latching device to lock two modules. The electrical plug device makes it possible that the modules to be connected are positioned with a single degree of freedom in the assembled position with direct contact between the mutually facing housing walls of the modules. The latching device allows these modules to be locked in the assembled position so that the modules can be connected to each other, or separated, electrically and mechanically without the aid of a tool.

In accordance with a preferred embodiment of the invention, two peripheral modules are assigned to the computer module, wherein one peripheral module is configured as a distribution module which can be connected to the computer module by way of first plug elements and first latching members disposed on a first housing wall of said distribution module, and to the second peripheral module by way of second plug elements and second latching members disposed on a second housing wall. The distribution module thus has an intermediary function, wherein the first plug element and the second plug element can be used to render practicable electrical transmission from the second peripheral module to the computer module. It is thus possible in an advantageous manner to dispense with a mechanical and electrical connection between the second peripheral module and the computer module. The electrical and mechanical connection is accomplished by means of the distribution module, wherein assembly is designed to be simple, using the latching device in the manner of a snap connection.

In accordance with a further development of the invention, the computer module and the peripheral module have a cuboid configuration. The modules are preferably dimensioned such that they form a cuboid-shaped unit when assembled. Thus, when plugged together and in a locked state, a compact unit is formed that forms the core of the checkout system and on which a monitor, for instance, can be positioned. The unused lateral sides, or the unused housing walls, of the modules terminate flush with the unused housing walls of the adjacent modules. The resulting construction is thus compact.

In accordance with a further development of the invention, the distribution module has on a front side a number of actuating members corresponding to the number of latching devices, by means of which the respective latching devices can be actuated. Unlocking in particular is user friendly and can be accomplished from one side of the distribution module.

In accordance with a further development of the invention, the modules have multiple ports on a rear side to provide electrical connections to further peripheral devices and/or to a power supply connection. In the assembled state, the rear sides of the modules extend in a common plane. Consequently, the peripheral devices, such as a monitor, a checkout keyboard, a scanner, a checkout printer and similar can be advantageously connected on a common side of the resulting unit.

In accordance with a further development of the invention, the distribution module is configured as a hub (I/O hub), and the second peripheral module as a power supply unit. Since a majority of the additional peripheral devices, such as monitor, checkout keyboard and similar are connected to the hub, the cost when changing the computer module and/or the power supply unit can be reduced since only the cables connected at the rear of the computer module or power supply unit respectively have to be unplugged.

The result is a modular arrangement of components in the checkout system so that, when replacing hardware or software, only the module has to be replaced. In addition, the modular construction makes it practicable that computer modules can be attached to the distribution module that are a different height.

In accordance with a further development of the invention, a memory unit is integrated into the distribution module so that checkout unit-related data can be stored in the distribution module. The checkout-specific data are thus advantageously available in the resulting unit when the computer module is replaced. After the computer module has been installed, it can read the checkout-specific data from the distribution module.

Further advantages of the invention will become clear from the additional dependent claims.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Embodiments of the invention are explained in more detail hereinafter with the aid of the drawings.

Figure 2:
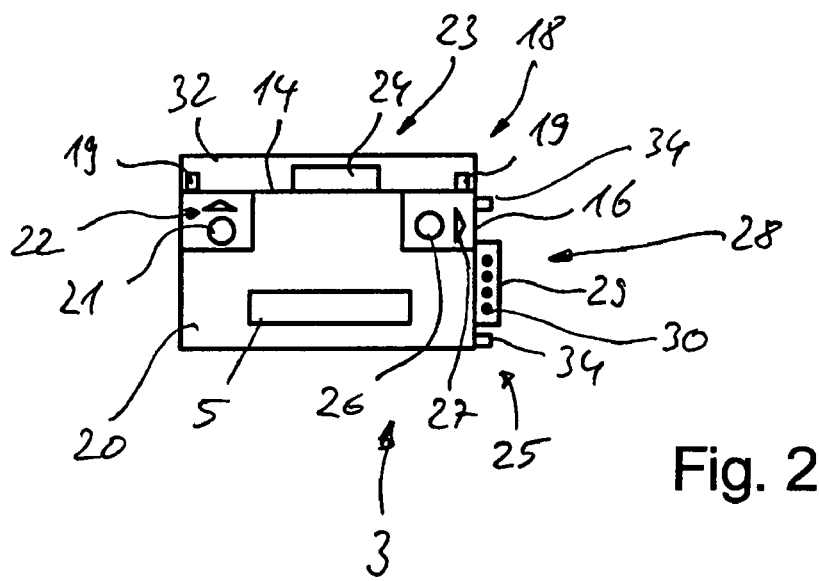
Figure 3:
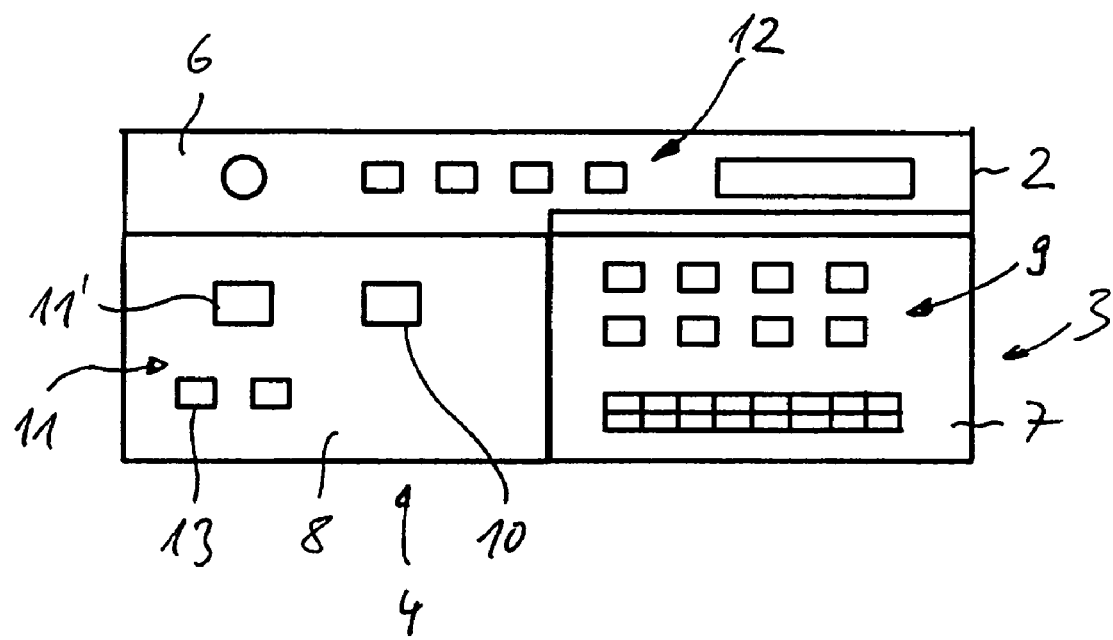

FIG. 1 shows a perspective front view of a checkout system in accordance with the invention, with three modules in the assembled state, FIG. 2 shows a front view of a distribution module of the checkout system, and FIG. 3 shows a rear view of the modules in the assembled state.

Corresponding reference numerals indicate corresponding parts throughout the several views of the drawings.

DETAILED DESCRIPTION

Example embodiments will now be described more fully with reference to the accompanying drawings.

A checkout system 1 for the handling of sales or payment transactions in supermarkets, for example, or similar consists in essence of an electronic checkout device that is composed in modular fashion of several modules. In the present embodiment, the checkout device consists of a computer module 2 for the electronic processing of payment-related data and two peripheral modules 3, 4, wherein a first peripheral module 3 is configured as a distribution module which is connected electrically and mechanically both to the computer module 2 and the second peripheral module 4. The computer unit has a mother board (main board) and a working memory. On one rear side 6 of the computer module 2 there are ports 12 (COM ports, USB ports, LAN ports).

The distribution module 3 is preferably configured as a hub in which a memory unit is integrated. Ports 9 are provided on one rear side 7 of the distribution module 3 that include, for example, a number of COM ports and 12-volt ports.

The memory unit 5 can, for example, be configured as a mass storage unit (hard disk, removable hard disk) or as a floppy disk drive, CD ROM drive, DVD drive or multicard reader.

The second peripheral module 4 is preferably configured as a power supply unit that on one rear side 8 of said module has as ports 11 a mains connection 11' to connect a cable to a power supply, a monitor port 10 for a cable connection to a monitor (not shown) and at least one additional power supply port 13 (24-volt) to feed other modules or peripheral devices.

The ports 9, 11, 12 render practicable the connection of retail peripheral devices, such as for example, checkout printers, barcode scanners, line displays, cash drawers, checkout keyboards, flat panel displays, etc., to the checkout device 1.

As is evident from FIG. 1, modules 2, 3, 4 have, respectively, a cuboid configuration. A lower area of the checkout device 1 is formed by the distribution module 3 and the additional peripheral module 4. The distribution module 3 has a second housing wall 16 (side wall) running perpendicular to a first housing wall 14 facing the computer module 2, which second wall, in the assembled position, adjoins along its surface a corresponding housing wall 15 of the second peripheral module. When in the assembled state, modules 2, 3, 4 form a cube-shaped, or cuboid-shaped, unit, wherein an upper housing wall 17 of the computer module 2 can act as a supporting surface for a monitor.

In the assembled position, the computer module 2 and the second peripheral module 4 are both connected electrically and mechanically to the distribution module 3. A first latching device 18 is provided for the electrical and mechanical coupling between the distribution module 3 and the computer module 2. Said latching device comprises latching members 19 projecting from the upper housing wall 14 of the distribution module that, in the assembled position (locked position), engage from behind a ridge (not shown) located on the computer module 2. In an upper area on a front side 20 of the distribution module 3, an actuating member 21 assigned to the first latching device 18 is provided that can be configured as a button so that unlocking between the distribution module 3 and the computer module 2 can be initiated by pressing the button. After being unlocked, the computer module 2 can then be lifted and removed from the distribution module 3. To visualize the assignment of the first actuating member 21 to the first latching device 18, a reference 22 (arrow) is assigned to the first actuating member 21.

A first plug device 23, which has plug/connection elements 24, is provided to make electrical contact between the computer module 2 and the distribution module 3. The plug/connection elements 24 of the distribution module 3 can be disposed in a front area of the first housing wall 14, wherein said elements are disposed as a multiple connector strip projecting from the first housing wall 14. The plug/connection elements 24 can be configured as a PCI multiple contact strip.

A second latching device 25, which has the same structure as the first latching device 18, is provided for the mechanical coupling between the distribution module 3 and the second peripheral module 4. The latching device 25 encloses latching members 34 projecting from the lateral housing wall 16 of the distribution module 3 that, in the assembled position (locked position), engage from behind a ridge (not shown) assigned to the second peripheral module 4.

The second latching device 25 extends along the second housing wall 16 of the distributor module 3 and can be operated by means of a second actuating member 26 configured identically to the first latching device 18. A reference 27 (arrow) assigned to the second actuating element 26 permits a simple visual indication of where the second latching device 25 is assigned, respectively the plane in which it takes effect.

A second plug device 28, which has strip-type plug/connection elements 29, is provided to make electrical contact between the distribution module 3 and the second peripheral module 4, wherein a plug/connection element 29 of the distribution module 3 projects from the second housing wall 16. The strip-type plug/connection elements 29 of the distribution module 3 have pins 30 oriented to the front side 20. The corresponding plug/connection elements of the peripheral module 4 are disposed complementarily to the plug/connection elements 29 in a recess (not shown) on the side wall 15 of the peripheral module 4 facing the second housing wall 16 of the distribution module 3. The depth and length of the recess is selected such that after actuating the second actuating member 26 and thus with the distribution module 3 and the peripheral module 4 unlocked, said peripheral module can be removed from the distribution module 3, or from computer module 2, by a combined motion to the front and then to the side as shown by arrow 31. The disassembly, or assembly, motion for the peripheral module takes place in a plane running parallel to the first housing wall 14 of the distribution module 3 so that removal of the peripheral module 4 from the distribution module 3 is rendered practicable without first having to remove the computer module 2 from the distribution module 3.

Since no mechanical and electrical coupling between the computer module 2 and the peripheral module 4 exists—although an upper housing wall of the peripheral module 4 adjoins a lower housing wall of the computer module 2 across its surface—the computer module 2 can be removed by lifting it from the two other modules 3, 4 after being unlocked through actuation of the first actuating element 21. To install the computer module 2, it is positioned by placing the back side 6 of said module against a retaining strip 32 projecting from the rear edge of the first housing wall 14 of the distribution module 3 perpendicular to said wall, forming an acute angle between the facing side walls 14 of the distribution module 3 and the computer module 2, and then pivoted downward until the latching elements 19 of the first latching device 18 lock automatically. During removal, actuation of the first actuating element 21 releases the lock of the first latching device 18 so that by placing the back side 6 of the computer module 2 against the retaining strip 32, said module 2 can be pivoted upward in the direction of arrow 33 and then removed to the front.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The invention claimed is:

1. A checkout system for handling sales or payment transactions comprising:
   a computer module for electronically processing payment-related data, and a distribution module which is connected electrically and mechanically to the computer module,
   wherein a housing wall of the distribution module adjoins a housing wall of the computer module such that the mutually facing housing walls of said computer module and said distribution module are arranged parallel,
   wherein the distribution module is in electrical contact with the computer module by means of a first electrical plug device,
   wherein the first electrical plug device has at least corresponding plug/connection elements which are respectively arranged on the mutually facing housing walls of the computer module,
   a power supply module, wherein the power supply module has an inner wall adjacent an inner wall of the distribution module;
   wherein the power supply module electrically communicates with the computer module through a second mating plug connection on the inner walls of the distribution module and the power supply module;
   wherein the distribution module can be mechanically locked to the computer module and/or to the power supply module by means of a latching device.

2. A checkout system from claim 1, wherein the computer module and the distribution and power supply modules are respectively configured cuboid-shaped and wherein the inner wall of the distribution module runs perpendicular to a lower surface of said computer module.

3. A checkout system from claim 1, wherein the computer module and the distribution and power supply modules are dimensioned such that they form a cuboid-shaped unit in the assembled state.

4. A checkout system from claim 1, wherein the distribution module has actuating elements on one front side, corresponding in number to the number of latching devices to actuate the respective latching device.

5. A checkout system from claim 1, wherein the computer module and at least one of the distribution and power supply modules respectively have ports on one rear side of said modules to connect to additional peripheral devices and/or to a power supply connection and wherein the back sides of the modules in the assembled state extend in a common plane.

6. A checkout system from claim 1, wherein the distribution module is configured as a hub.

7. A checkout system from claim 1, wherein a storage unit is disposed integrally in the distribution module.

8. A checkout system from claim 1, wherein a first latching device and a second latching device of the distribution module respectively have latching members that in the locked position engage from the back a ridge assigned to said distribution module and disposed on the power supply module and the computer module.

9. A checkout system for handling financial transactions, comprising:
   a cuboid computer module having a front surface and a lower surface;

a cuboid distribution module having a front surface, an upper surface and an inner side surface;

a cuboid power supply module having a front surface, an upper surface and an inner side surface;

the computer module, the distribution module and the power supply module being removably connected together such that the lower surface of the computer module covers the upper surfaces of the distribution module and the power supply module;

said inner sides of the distribution module and the power supply module abutting each other, with the front surfaces of the distribution module and power supply module being vertically aligned with the front surface of the computer module;

a first latch on the upper surface of the distribution module for removably connecting the distribution module to the computer module;

a second latch on an inner side of the distribution module for removably connecting the distribution module to the power supply module;

a first electrical plug on the distribution module for electrically connecting the distribution module to the computer module;

a second electrical plug on the inner side of the distribution module for electrically connecting the distribution module to the power supply module;

wherein the power supply module electrically communicates with the computer module through the distribution module; and actuating devices for actuating the first and second latches.

10. The checkout system of claim 9 wherein the actuating devices are separate buttons on the front surface of the first peripheral module.

11. A checkout system for handling sales or payment transactions comprising:

a computer module for electronically processing payment-related data, with at least one peripheral module which is connected electrically and mechanically to the computer module, wherein a housing wall of at least one peripheral module adjoins a housing wall of the computer module such that the mutually facing housing walls of said computer module and said peripheral module are arranged parallel, wherein the peripheral module is in electrical contact with the computer module and/or with a further peripheral module by means of an electrical plug device, wherein the electrical plug device has at least corresponding plug/connection elements which are respectively arranged on the mutually facing housing walls of the adjacent modules, wherein the peripheral module can be mechanically locked to the computer module and/or to at least the further peripheral module by means of a latching device; and wherein references are assigned to actuating elements to visually indicate the plane in which the latching device takes effect.

12. A checkout system for handling financial transactions, comprising:

a cuboid computer module having a front surface and a lower surface;

a cuboid first peripheral module having a front surface, an upper surface and an inner side surface;

a cuboid second peripheral module having a front surface, an upper surface and an inner side surface;

the computer module, the first peripheral module and the second peripheral module being removably connected together such that the lower surface of the computer module covers the upper surfaces of the first peripheral module and the second peripheral module;

said inner sides of the first peripheral module and the second peripheral module abutting each other, with the front surfaces of the first peripheral module and second peripheral module being vertically aligned with the front surface of the computer module;

a first latch on the upper surface of the first peripheral module for removably connecting the first module to the computer module;

a second latch on an inner side of the first peripheral module for removably connecting the first peripheral module to the second peripheral module;

electrical plugs on the first peripheral module for electrically connecting the first peripheral module to the computer module and to the second peripheral module;

actuating devices for actuating the first and second latches, the actuating devices being separate buttons on the front surface of the first peripheral module; and reference indicators adjacent the buttons to visually indicate which latch the buttons actuate.

* * * * *